(12) United States Patent
Wang et al.

(10) Patent No.: US 7,916,308 B2
(45) Date of Patent: Mar. 29, 2011

(54) METHOD AND OPTICAL PROFILER

(75) Inventors: Jianmin Wang, Fremont, CA (US);
Jason L. Pressesky, Menlo Park, CA (US); Shih-Fu Lee, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 609 days.

(21) Appl. No.: 10/700,625

(22) Filed: Nov. 5, 2003

(65) Prior Publication Data

US 2004/0196469 A1  Oct. 7, 2004

Related U.S. Application Data

(60) Provisional application No. 60/459,760, filed on Apr. 1, 2003.

(51) Int. Cl.
*G01B 11/24* (2006.01)
(52) U.S. Cl. .................. 356/601; 356/495
(58) Field of Classification Search .......... 356/601, 356/495
See application file for complete search history.

(56) References Cited

U.S. PATENT DOCUMENTS

| | | | |
|---|---|---|---|
| 3,885,875 A * | 5/1975 | Rosenfeld et al. | 356/369 |
| 4,522,510 A * | 6/1985 | Rosencwaig et al. | 374/7 |
| 4,639,139 A | 1/1987 | Wyant et al. | |
| 4,764,014 A | 8/1988 | Makosch et al. | |
| 4,845,356 A * | 7/1989 | Baker | 250/225 |
| 4,872,755 A * | 10/1989 | Kuchel | 356/495 |
| 4,945,281 A | 7/1990 | Dell'Eva et al. | |
| 5,029,023 A * | 7/1991 | Bearden et al. | 369/69 |
| 5,428,447 A * | 6/1995 | Toida | 356/601 |
| 5,726,455 A * | 3/1998 | Vurens | 250/559.28 |
| 5,737,084 A * | 4/1998 | Ishihara | 356/609 |
| 5,810,719 A * | 9/1998 | Toida | 600/160 |
| 5,880,838 A * | 3/1999 | Marx et al. | 356/498 |
| 6,181,430 B1 | 1/2001 | Meyer et al. | |
| 6,320,665 B1 | 11/2001 | Ngoi et al. | |
| 6,373,978 B1 * | 4/2002 | Ishihara | 382/154 |
| 6,392,749 B1 | 5/2002 | Meeks et al. | |
| 6,525,824 B1 | 2/2003 | Gutierrez | |
| 6,917,419 B2 * | 7/2005 | Fielden et al. | 356/237.2 |
| 2002/0126257 A1 * | 9/2002 | Kobayashi et al. | 351/215 |
| 2002/0180983 A1 | 12/2002 | Ina et al. | |

FOREIGN PATENT DOCUMENTS

| | | |
|---|---|---|
| DE | 40 17 935 A1 | 12/1991 |
| DE | 196 00 491 C1 | 7/1997 |
| DE | 195 25 903 A1 | 9/1997 |
| DE | 196 50 391 A1 | 6/1998 |
| JP | 62282206 | 12/1987 |
| JP | 10-221037 | 8/1998 |
| JP | 2000-275027 | 10/2000 |
| WO | WO 92/08104 | 5/1992 |
| WO | WO 02/42754 A2 | 5/2002 |

* cited by examiner

*Primary Examiner* — Tarifur R. Chowdhury
*Assistant Examiner* — Isiaka O Akanbi

(57) ABSTRACT

An optical profiler for an ultra-smooth surface, such as a magnetic recording disk, provides for a normally incident beam deflection against the target surface to be profiled. A linearly polarized laser light of a first polarization is focused on the target surface in a normally incident direction. The beam is reflected back along its original path from the focal point. Optics are provided that change the polarization of the reflected beam to a second polarization. A reflected beam, with a second polarization, is directed onto a position sensitive detector for evaluation.

11 Claims, 1 Drawing Sheet

METHOD AND OPTICAL PROFILER

RELATED APPLICATIONS

This Application claims priority to Provisional Application Ser. No. 60/459,760, filed on Apr. 1, 2003, the entire disclosure of which is herein incorporated by reference.

FIELD OF THE INVENTION

The present invention relates to the field of measuring thin films, including films provided on a disk for hard disk drives, and more particularly, to arrangements and methods for measuring the topography of an ultra-smooth surface of such a magnetic-recording disk.

BACKGROUND

Coated thin film disks are used in a variety of industries. One example is the computer hard disk industry. The computer hard disk (magnetic storage device) is a non-volatile memory device that can store large amounts of data.

An important specification in the design and manufacture of thin film media for hard disk drives is HMS_Wq, otherwise known as r.m.s. head-media spacing modulation. The HMS_Wq provides a measure of the spacing between a read/write head and the ultra-smooth surface of the thin film on the hard disk. An instrument currently used by designers to measure this parameter is known as the Candela profilometer. A description of such a profilometer is provided in U.S. Pat. No. 6,392,749.

The Candela profilometer infers the local slope of a disk surface by measuring the deflection of a collimated optical beam that is incident upon a disk surface at an oblique angle. One of the advantages of this technique is that it is affected very little by disk mode vibrations of the spinning disk under test. However, the technique is very sensitive to proper optical alignment and is not easily portable. This limits the usefulness of the Candela profilometer.

Another drawback to the arrangement provided by the Candela profilometer is that it normally measures both height and slope information. In order to obtain a measurement of just the height or the slope, special arrangements of the Candela profilometer are required, including employing multiple lasers to provide measurement signals.

Another type of method of measuring HMS_Wq is with a laser doppler vibrometer (LDV). Unlike the Candela profilometer, the LDV technique is a readily portable technique. However, because the LDV technique measures out-of-plane motion, the HMS_Wq measurement is easily contaminated by disk mode vibrations.

SUMMARY OF THE INVENTION

There is a need for an optical profiler able to measure the topography of an ultra-smooth surface, such as on a hard disk, that is portable, cost-effective and capable.

This and other needs are met by embodiments of the present invention which provide an apparatus for measuring surface topography of a surface comprising a linearly polarized light source that generates a light beam. Optics are provided that focus the light beam on a surface to be measured such that a normally incident beam deflection is provided. The optics include polarization optics such that the incident beam has a first polarization and a reflected beam from the surface has a second polarization different from the first polarization. A position sensitive detector is positioned to detect the reflected beam.

The earlier stated needs are also met by other aspects of the present invention which provide a method of measuring the topography of a surface comprising the steps of directing a beam of light of a first polarization towards the surface to be measured. The beam of light is directed at the surface in a direction normally incident to the surface, with a reflected beam from the surface also being normally incident to the surface. The polarization of the reflected beam is changed to a second polarization different from the first polarization. The reflected beam with the second polarization is directed to a position sensitive detector. From the measurements taken at the position sensitive detector, the topography is determined.

The earlier stated needs are met by still further aspects of the present invention which provide an arrangement for measuring topography of an ultra-smooth surface comprising a source of laser light, and means for directing the laser light on the ultra-smooth surface and measuring the topography of the ultra-smooth surface.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to optical profiling of surfaces, such as ultra-smooth surfaces on magnetic recording disks. In particular, the present invention provides a device that is portable, cost-effective and capable. It achieves this by using a normally incident beam deflection methodology. The normally incident approach is enabled by utilizing the polarization properties of light. Accordingly, the measurement apparatus comprises relatively few optical components and is readily made into a compact and portable device. The device is useful in forming HMS_Wq measurements or any applications where topographical characterization of ultra-smooth surfaces is required.

Figure 1:
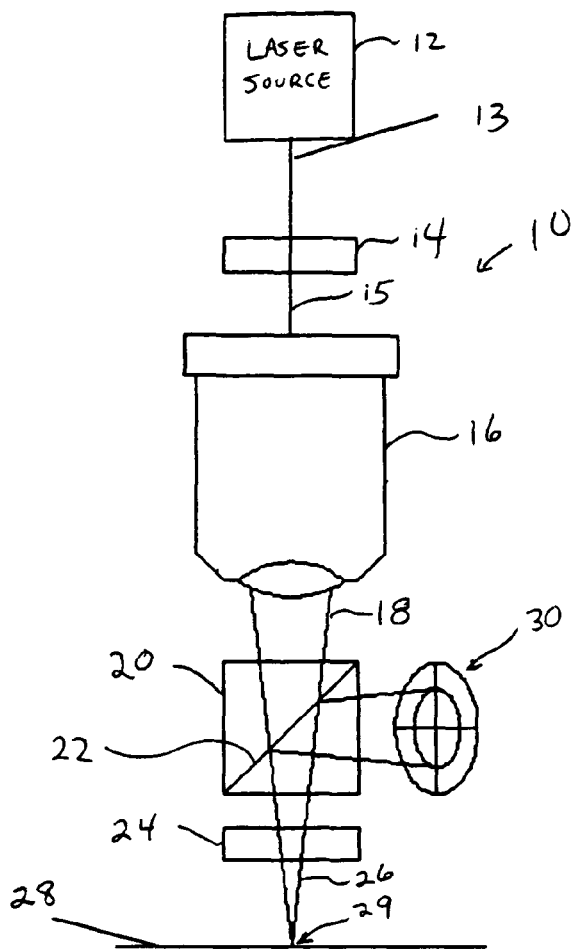
FIG. 1 depicts a schematic side view of an optical profiler constructed in accordance with embodiments of the present invention.

FIG. 1 depicts an exemplary embodiment of an optical profiler constructed in accordance with the present invention. One of the advantages of the present invention is the use of conventional components that are assembled to make the present invention in the manner depicted in FIGS. 1 and 3. This makes the arrangement very cost-effective.

The optical profiler 10 in FIG. 1 includes a laser light source 12 and provides a collimated beam of linearly polarized laser light 13. The laser light may have a wide variety of different wavelengths. An exemplary wavelength suitable for the use in the present invention is 650 nm. The collimated beam of linearly polarized laser light 13 is provided to a half-wave plate 14. As is well known, half-wave plates are able to change the direction of linear polarization of a polarized light beam. In the present invention, the half-wave plate 14 is aligned so that the transmitted beam 15 comprises primarily p-polarized light.

A long working distance microscopic objective 16 receives the p-polarized light from the half-wave plate 14. A long working distance microscopic objective acts to convert the collimated beam 15 of p-polarized light into a converging beam 18. Convergence is such that the beam 18 is brought to a sufficiently small spot at the focal point upon the target or a test surface 28. Due to the beam 18 being arranged to be normally incident to the surface 28, this test spot on the test surface 28 may be very small, especially in comparison to arrangements in which the laser light strikes the surface at an oblique angle.

After the long working distance microscopic objective 16, the converging beam 18 passes through a polarizing beam splitter 20. The p-polarized light in the converging beam 18 is transmitted by the polarizing beam splitter 20 with little reflection loss. The converging beam 18 passes through the 45 degree surface 22 of the polarizing beam splitter 20 and through a quarter-wave plate 24. The alignment of the quarter-wave plate 24 is such that the polarization of the reflected beam 26 is changed to contain only s-polarization.

Since the beam 18 is normally incident upon the test surface 28, which is a highly reflective, ultra-smooth surface, the reflected beam 26 is reflected back along its original path from the focal point 29.

In the embodiment of FIG. 1, a 45-degree surface 22 of the polarizing beam splitter 20 is positioned to direct the reflected beam in direction perpendicular to the normal incident beam 18. A position sensitive detector 30 is positioned to detect the beam 26 reflected from the test surface 28 and the 45-degree surface 22 of the polarizing beam splitter 20. Based upon the measurements taken at the position sensitive detector 30, a signal processor is able to determine the topography of the surface 28 in a manner more detailed below. This can be achieved by a conventional processor (not shown).

Figure 2:
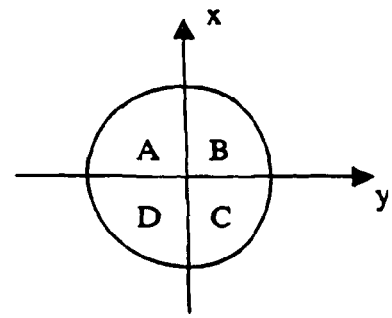
FIG. 2 depicts quadrants for a position sensitive detector on an x-y axis system.

FIG. 2 depicts the four quadrants A, B, C and D, and the position sensitive detector 30 provides an output signal from each of these quadrants. In FIG. 2, the z-direction is considered to be normal to the plane of the page. Transferring the coordinate system onto the target 29 with the set-up illustrated in FIG. 1, the corresponding coordinates on the target 29 can be defined as: x and z directions are horizontal and vertical in the plane of the page, respectively. The y direction is normal to the plane of the page. For slopes whose direction normal lies in the x-z plane, the light beam 18 is deflected by the local slope of the reflecting target surface 28, causing the signal to be enhanced or depleted in the A, B and C, D quadrants. For slopes whose direction normal lies in the y-z plane, enhancement/depletion occurs in the A, D and B, C quadrants. For small slopes, the following relationships pertain:

$$m_{xz}=k_1*[(A+B)-(C+D)]/(A+B+C+D)$$

$$m_{yz}=k_2*[(A+D)-(B+C)]/(A+B+C+D)$$

wherein $k_1$ and $k_2$ are constants of proportionality between the measured signal and the local surface slope.

Assuming that the surface profile is represented by f(x) in the x-direction, then df/dx=slope, where x is the distance along the measurement direction. The profile or topography of the surface 28 can be calculated by integration of the slope information, by the processor (not shown).

Due to the beam's normal incidence, the signals measured by the position sensitive detector 30 contain only slope information. There is no need to provide a second laser or other measure to separate the height and slope information, as provided by known arrangements.

Figure 3:
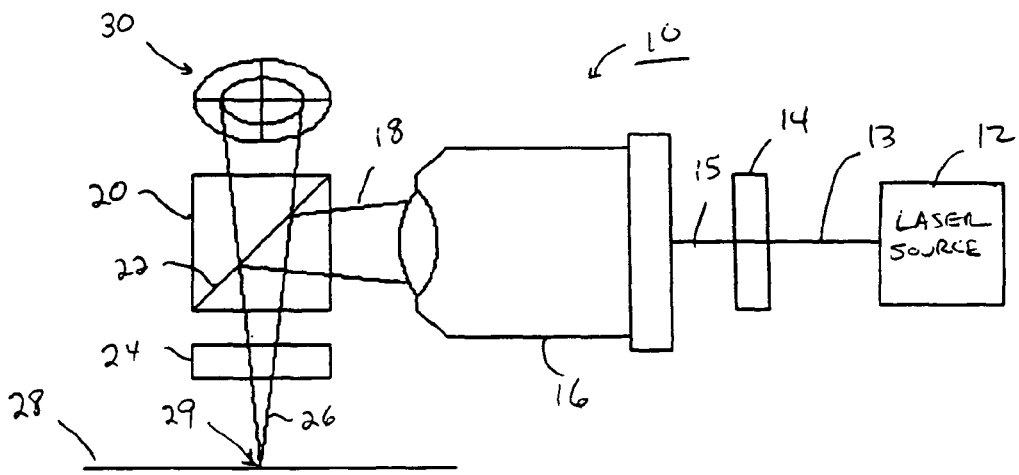
FIG. 3 depicts an alternate embodiment of the optical profiler constructed in accordance with the present invention.

FIG. 3 shows another aspect of the present invention in which the optical arrangement is configured in a manner that allows the overall height of the device to be minimized. The same reference numerals are provided for the individual elements in FIG. 3 as in the embodiment of FIG. 1. However, in the embodiment of FIG. 3 the laser light is generated and directed to the polarizing beam splitter 20 in a direction that is perpendicular to the normally incident beam directed towards the surface 28. The 45-degree reflecting surface 22 of the polarizing beam splitter 20 redirects the converging beam 18 towards the surface 28 and through the quarter-wave plate 24. Instead of the reflected beam from the surface 28 being directed in a perpendicular direction to the position sensitive detector 30, the embodiment of FIG. 3 allows the reflected beam to pass through the polarizing beam splitter 20 in a normally incident direction to the surface 28. The reflected beam strikes the position sensitive detector 30. This arrangement is useful, for example, in applications where mechanical clearance is limited, such as in measuring the lower disk surface on a spin stand. The measurements and relationships with regard to the signals from the position sensitive detector 30 remain the same as in the embodiment of FIG. 1.

The embodiments of the present invention provide an optical system for measuring the surface topography of ultra-smooth surfaces by using a normally incident beam deflection method. The arrangement reduces the test spot size and the beam deflection method, especially in comparison to previous arrangements. By employing a normally incident beam method and arrangement, the slope of ultra-smooth surfaces may be measured without the confounding effects of surface height change. Aspects of the invention provide for a device that is portable, cost-effective, and capable, as well as certain embodiments providing for a reduced overall device height.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. An apparatus for measuring surface topography of a surface comprising:
    a linearly polarized light source that generates a light beam;
    optics that focus the light beam on a surface to be measured such that a normally incident beam deflection is provided, the optics including polarization optics such that the incident beam has a first polarization and a reflected beam from the surface has a second polarization different from the first polarization, the optics including: a half-wave plate that receives the light beam from the linearly polarized light source; a long working distance microscope objective positioned to receive the light beam as an input from the half-wave plate and output a converging light beam; and a polarizing beam splitter positioned to receive as an input the output of the long working distance microscope objective and produce as an output a light beam with the first polarization;
    wherein the optics further include a quarter-wave plate positioned to receive as an input the light beam with the first polarization and output a beam in a direction normally incident to the surface, the reflected beam from the surface being reflected by the quarter-wave plate towards the position sensitive detector with the second polarization; and a position sensitive detector positioned to detect the reflected beam.

2. The apparatus of claim 1, wherein the first polarization is p-polarization and the second polarization is s-polarization.

3. The apparatus of claim 2, wherein the polarizing beam splitter includes a 45° reflective surface positioned to reflect the beam reflected from the surface in a direction perpendicular to the direction normally incident to the surface.

4. The apparatus of claim 1, wherein the long working microscope objective outputs the converging light beam in a direction perpendicular to a normally incident direction to the surface.

5. The apparatus of claim 4, wherein the optics further include a polarizing beam splitter having a 45° reflective surface positioned to reflect the converging light beam from the long working microscope objective towards the surface in a normally incident direction to the surface.

6. The apparatus of claim 5, wherein the optics further include a quarter-wave plate positioned to receive as an input the light beam with the first polarization from the polarizing beam splitter and output a beam that is normally incident of the surface, with a reflected beam from the surface having the second polarization and directed by the quarter-wave plate through the polarizing beam splitter in a direction normal to the surface towards the position sensitive detector.

7. A method of measuring the topography of a surface, comprising:
  directing a beam of light of a first polarization towards a surface to be measured, the beam of light being directed at the surface in a direction normally incident to the surface, with a reflected beam from the surface also being normally incident to the surface, the directing including generating a collimated beam of linearly polarized light and passing the collimated beam through a half-wave plate; converging the collimated beam with a long working distance microscope objective to output a converging beam; and transmitting the converging beam through a polarizing beam splitter in a direction normally incident to the surface;
  changing the polarization of the reflected beam to a second polarization different from the first polarization;
  directing the reflected beam with the second polarization to a position sensitive detector;
  wherein the changing the polarization includes passing the reflected beam through a quarter-wave plate that changes the polarization of the reflected beam to the second polarization from the first polarization
  determining the topography from measurements taken at the position sensitive detector.

8. The method of claim 7, wherein the directing the reflected beam includes reflecting the reflected beam perpendicularly at the polarizing beam splitter towards the position sensitive detector.

9. The method of claim 7, wherein the directing a beam of light includes directing the converging beam in a direction perpendicular to a normally incident direction to the surface towards a reflective surface of a polarizing beam splitter that reflects the converging beam towards the surface in a direction normally incident to the surface.

10. The method of claim 9, wherein the directing the reflected beam includes transmitting the reflected beam through the polarizing beam splitter in a normal direction to the surface towards the position sensitive detector.

11. An apparatus for measuring surface topography of a surface comprising:
  a linearly polarized light source that generates a light beam;
  optics that focus the light beam on a surface to be measured such that a normally incident beam deflection is provided, the optics including polarization optics such that the incident beam has a first polarization and a reflected beam from the surface has a second polarization different from the first polarization, the optics including: a half-wave plate that receives the light beam from the linearly polarized light source; a long working distance microscope objective positioned to receive the light beam as an input from the half-wave plate and output a converging light beam; and a polarizing beam splitter positioned to receive as an input the output of the long working distance microscope objective and produce as an output a light beam with the first polarization; and
  a position sensitive detector positioned to detect the reflected beam;
  wherein the optics further include a quarter-wave plate positioned to receive as an input the light beam with the first polarization from the polarizing beam splitter and output a beam that is normally incident of the surface, with a reflected beam from the surface having the second polarization and directed by the quarter-wave plate through the polarizing beam splitter in a direction normal to the surface towards the position sensitive detector;
  wherein the optics further include the polarizing beam splitter having a 45° reflective surface positioned to reflect the converging light beam from the long working microscope objective towards the surface in a normally incident direction to the surface.

* * * * *